United States Patent [19]
Satoh et al.

[11] Patent Number: 5,689,375
[45] Date of Patent: Nov. 18, 1997

[54] OPTICAL APPARATUS

[75] Inventors: Tatsuya Satoh; Masaharu Eguchi, both of Kanagawa-ken, Japan

[73] Assignee: Canon Kabushiki Kaisha, Tokyo, Japan

[21] Appl. No.: 768,194

[22] Filed: Dec. 17, 1996

Related U.S. Application Data

[63] Continuation of Ser. No. 133,977, Oct. 8, 1993, abandoned.

[30] Foreign Application Priority Data

Oct. 19, 1992 [JP] Japan ................................. 4-306559
Oct. 30, 1992 [JP] Japan ................................. 4-314412

[51] Int. Cl.⁶ ................................................. G02B 15/14
[52] U.S. Cl. ................................. 359/699; 359/694
[58] Field of Search ................................. 359/694, 696, 359/697, 698, 699, 700, 701, 811, 819, 828

[56] References Cited

U.S. PATENT DOCUMENTS

| | | | |
|---|---|---|---|
| 4,230,403 | 10/1980 | Hashimoto | 354/286 |
| 5,052,781 | 10/1991 | Iizuka | 359/823 |
| 5,144,490 | 9/1992 | Yamanochi | 359/694 |
| 5,144,494 | 9/1992 | Sekiguchi | 359/700 |
| 5,177,639 | 1/1993 | Kohmoto | 359/740 |
| 5,196,963 | 3/1993 | Sato | 359/699 |
| 5,198,932 | 3/1993 | Takamura | 359/694 |
| 5,270,868 | 12/1993 | Nomura | 359/700 |
| 5,335,115 | 8/1994 | Kawai et al. | 359/696 |
| 5,424,793 | 6/1995 | Fukushima | 354/199 |

*Primary Examiner*—Georgia Y. Epps
*Assistant Examiner*—Ricky Mack
*Attorney, Agent, or Firm*—Robin, Blecker, Daley and Driscoll

[57] ABSTRACT

An optical apparatus includes a lens movably supported, a driving part arranged to rotate for causing the lens to move, a moving mechanism arranged to cause the lens to move by the rotation of the driving part, and an adjusting mechanism arranged to cause the moving mechanism to move the lens for fine adjustment by applying rotational driving to the moving mechanism without recourse to the driving part.

21 Claims, 16 Drawing Sheets

OPTICAL APPARATUS

This is a continuation under 37 CFR 1.62 of prior application Ser. No. 08/133,977, filed Oct. 8, 1993 now abandoned.

BACKGROUND OF THE INVENTION

1. Field of the Invention

This invention relates to an optical apparatus arranged to be capable of moving a lens.

2. Description of the Related Art

In adjusting focus errors of a zoom lens at a telephoto end position and a wide-angle end position, the adjustment work is generally performed using a collimater or the like on a whole optical system in a state of having a mount attached to the optical system. It has been, therefore, practiced to have a first lens group (a front lens group), which is easy to work from outside, moved in the direction of thrust for the focus adjustment and also for cutting work on the mount as necessary.

According to the conventional arrangement, the first lens group (front lens group) which has a low optical sensitivity is moved in the direction of thrust. With respect to a manufacturing error for the whole zoom lens, therefore, the amount of focus error adjustment to be made at the telephoto and wide-angle end positions becomes extremely large. As a result, the amount of movement of the first lens group also becomes large to bring about such a problem that the movement of the first lens comes to optically eclipse a light flux.

Further, in a case where a second lens group is a focus lens group, the amount to which the focus lens group can be drawn out for focusing is limited by the large amount of movement of the first lens group in the direction of an optical axis. Then, it becomes hardly possible to make the nearest shootable distance short.

FIG. 16 shows in a sectional view an example of the conventional interchangeable zoom lens. The illustration includes a mount 101, an external ring 102, a distance ring 103, an optical axis 104, a holding ring 105, a zooming operation ring 106, a hood frame 107, a back lid 108, a guide tube 109, a cam tube 110, a male helicoid 111, a filter frame 112, a first lens group tube 113, a first lens group moving ring 114, a second lens group tube A 115, a second lens group tube B 116, a diaphragm 117, a first lens group 118, a second lens group 119, a third lens group 120, a focus key 121, a zoom connection plate 122, a connection screw 123 and a rubber ring 124 which is mounted on the zooming operation ring 106.

In the case of this example, the conventional arrangement is applied to a zoom lens barrel of a so-called 3-group short zoom type. Since an arrangement for moving an optical system for zooming is well known, the details of it are omitted from description.

In the conventional arrangement described above, the zooming operation ring 106 is disposed in front of the distance ring 103 which is carried jointly by the holding ring 105 and the external ring 102 secured to the mount 101 by a screw 125. The zooming operation ring 106 is fitted diametrically into the hood frame 107 and is carried jointly by the holding ring 105 and the hood frame 107 in the direction of thrust. The hood frame 107 is diametrically fitted in the holding ring 105 and is radially screwed and secured to the holding ring 105 by a screw 126.

The zoom connection plate 122 is secured to the cam tube 110 by a screw 127 and is thus arranged to be rotatable integrally with the cam tube 110 at a set position. The zoom connection plate 122 extends from its part fixed by the screw 127 to a part below the inner diameter part of the zooming operation ring 106. A connection screw 123 pierces through a hole part 106c which is formed in the zooming operation ring 106 to extend in the direction of the optical axis and a circumferential hole 107f which is formed in the hood frame 107 in a shape extending to an extent corresponding to the angle of zooming rotation. The zooming operation ring 106, the hood frame 107 and the zoom connection plate 122 are thus connected by the connection screw 123 in an overlapped manner. The hole part 106c is covered with the rubber ring 124 when the assembly work on the zoom lens is completed.

An apparatus having a rotary operation member such as a lens in the case of the examples described above generally has, at the fore end of its operation part, a bayonet part 107a with a mounting index mark (not shown) for mounting a hood and a fixed part arranged adjacent to the operation part to indicate graduations with numeral marks or index lines, etc., for indicating the rotation angle of an operation ring.

In the case of the example of the conventional arrangement described, the hood frame 107 which serves as a shaft part of a rotary operation member is mounted on a fixed part (the holding ring 105 secured to the mount 101 in the case of FIG. 16) by piercing through the rotary operation member such as a lens (the zooming operation ring 106 in the case of FIG. 16). For mounting the hood frame 107, the conventional arrangement necessitates the hood frame 107 to be provided with a screwing part. In this instance, however, the screwing connection is inapposite, because it tends to cause a deviation in angular phase. The fixing work with a screw can be easily carried out by radially screwing from the outer circumference of a ring (see the part fixed by the screw 126 shown in FIG. 16).

In this instance, tapping and screwing work can be accomplished at a thickness necessary for a casing if the hood frame 107 is made of a metal material. However, it is a recent trend to use a plastic material for reduction in cost. Assuming that a self-tapping screw is used for such a material, it is then necessary to secure a sufficient tapping strength by adding a thick boss part 107b as shown in FIG. 16. If a metal material is used, its thickness alone permits screwing without recourse to any thick boss part 107b. The use of a plastic material thus has often caused a disadvantage with respect to spatial disposal and assembling work because of addition of the boss part 107b.

More specifically, according to the conventional arrangement, the boss part 107b is disposed in a space available within a casing as shown in FIG. 16. However, the parts of the hood frame 107 such as the bayonet part 107a for mounting a hood are apt to be damaged by some impact and thus relatively often necessitate disassembly and replacement. In carrying out the disassembling and replacing work on the hood frame 107, that is, in removing the hood frame 107, the boss part 107b in question abuts on the filter frame 112 and the first lens group tube 113. The filter frame 112 and the first lens group tube 113, therefore, must be disassembled before the work. The conventional arrangement thus has degraded workability for servicing or repair work.

The degraded workability for servicing work on a member such as the hood frame 107 which is disposed at the external fore end part of an apparatus and is highly vulnerable to an external shock thus has presented a serious problem.

SUMMARY OF THE INVENTION

In one aspect of this invention, there is provided an optical apparatus which permits fine adjustment work to be easily carried out by using a helicoid lead on the position of a lens arranged to be rotationally movable by the lead of a helicoid.

In another aspect of this invention, there is provided an optical apparatus wherein an operation ring is rotatably supported between a fixed member and a semi-fixed member, and the operation ring is arranged to be caused to engage both the fixed and semi-fixed members by rotation while the semi-fixed member is arranged to be fixed in a predetermined position by being rotated relative to the fixed member. By virtue of this arrangement, the optical apparatus excels in workability for disassembly and assembly work thereon.

The above and other aspects and features of this invention will become apparent from the following detailed description of embodiments thereof taken in connection with the accompanying drawings.

Figure 1:
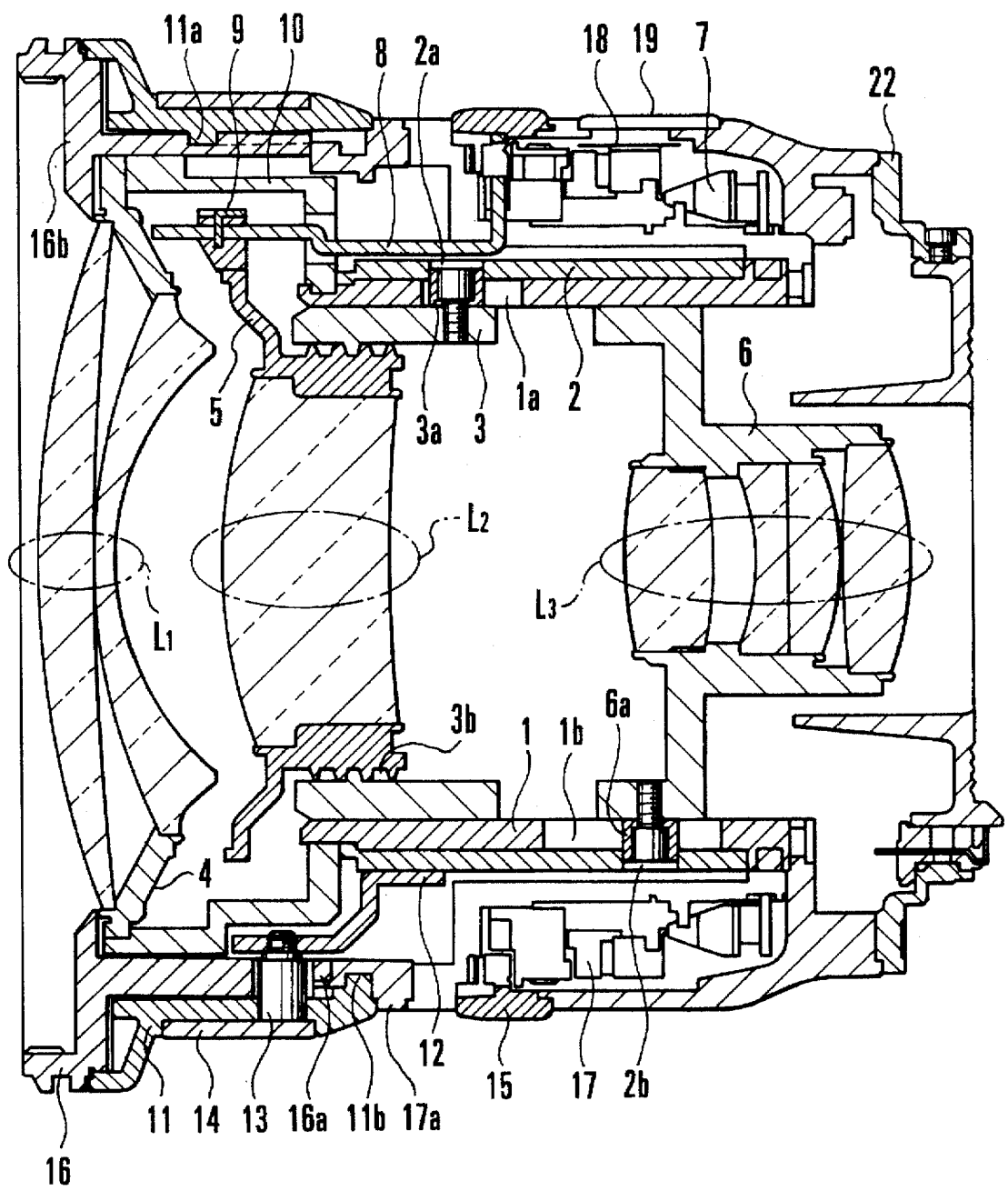
FIG. 1 is a vertical sectional view showing a whole zoom lens arranged according to this invention as a first embodiment thereof.

DETAILED DESCRIPTION OF THE PREFERRED EMBODIMENTS:

FIG. 1 is a vertical sectional view showing the whole arrangement of a zoom lens arranged according to this invention as a first embodiment thereof. Referring to FIG. 1, a first moving frame 3 and a second moving frame 6 which carries a third lens group L3 are fitted into the inner diameter part of a guide tube 1 in such a way as to be slidable in the direction of an optical axis. A cam follower 3a which is attached to the first moving frame 3 by a screw or the like and a cam follower 6a which is attached to the second moving frame 6 by a screw or the like are respectively inserted into rectilinear guide slots 1a and 1b provided in the guide tube 1 and also into cam slots 2a and 2b which are formed in a cam tube 2 which is rotatably fitted on the outer diameter part of the guide tube 1.

A first holding frame 4 is discussed below. A second holding frame 5 which is arranged as a focus lens tube to carry a second lens group (focus lens group) L2 is coupled by a helicoid 3b to the inner diameter part of the first moving frame 3. On the other hand, a focus key 8 which is arranged as a focus adjusting member to directly transmit the rotation of an ultrasonic motor 7 employed as driving means is inserted into a focus adjustment key 9 which is mounted on the second holding frame 5. A fixed frame 10 which is bayonet-coupled is mounted on the fore end part of the guide tube 1. A first holding frame 4 which carries a first lens group (a fixed lens group) L1 is mounted on the fixed frame 10.

A hood mounting ring 16 is fitted on the outer circumferential part of the fixed frame 10. The hood mounting ring 16 is provided with a projection 16a for preventing a turning movement, which is pressure-fitted into a connection ring 17a of a motor unit 17 which includes the ultrasonic motor 7. A zoom ring 11 is fitted on the outer circumferential part of the hood mounting ring 16. The zoom ring 11 is bayonet-coupled respectively with the connection ring 17a and the hood mounting ring 16 and is rotatably mounted on them.

The cam tube 2 and the zoom ring 11 are connected to each other by a zoom key 12 which is fixedly secured to the cam tube 2 and a zoom ring mounting screw 13 which is fixedly secured to the zoom ring 11. A rubber piece 14 is wound around an outer circumferential part of the zoom ring 11. The ultrasonic motor 7 is provided with a distance graduation part 18, and there is provided a graduation window 19 for making the distance graduation part 18 visible from outside.

With the zoom lens arranged in this manner, when the second holding frame 5 is rotated either by the ultrasonic motor 7 or by a manual ring 15, a focusing action is performed by the second lens group L2 by moving the second holding frame 5 forward or backward in the direction of an optical axis according to the lead of the helicoid 3b. On the other hand, when the zoom ring 11 is operated by rotation, the first moving frame 3 and the second holding frame 5 move in the direction of the optical axis being guided by the cam slot 2a of the cam tube 2 and the rectilinear guide slot 1a of the guide tube 1, while the second moving frame 6 moves also in the direction of the optical axis being guided by the cam slot 2b of the cam tube 2 and the rectilinear guide slot 1b of the guide tube 1. A zooming action is thus performed by the second lens group L2 and the third lens group L3.

Figure 2:
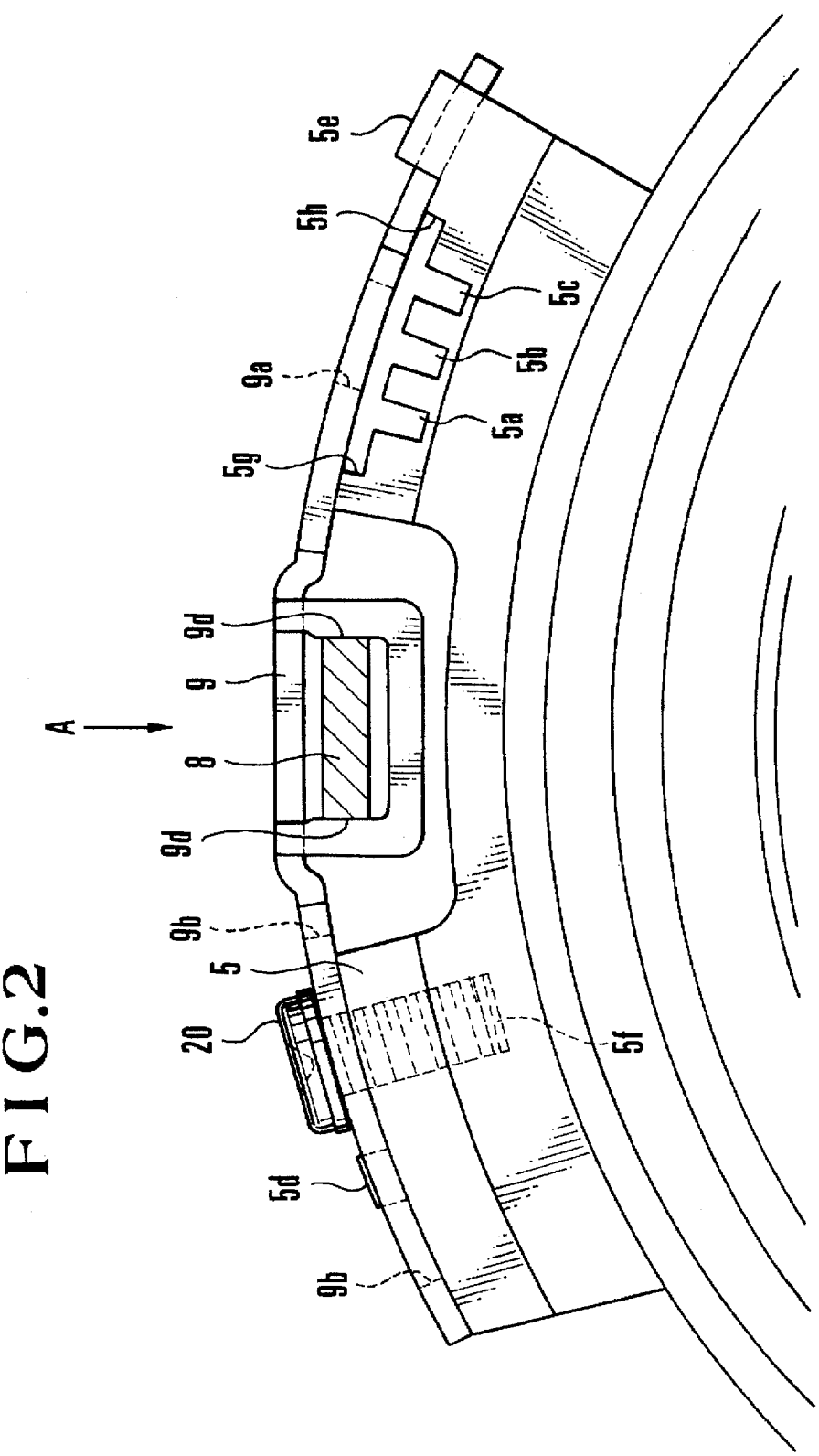
FIG. 2 is a front view showing a relation among a focus lens tube, a focus key and a focus adjustment key as viewed from the fore end of a lens.
Figure 3:
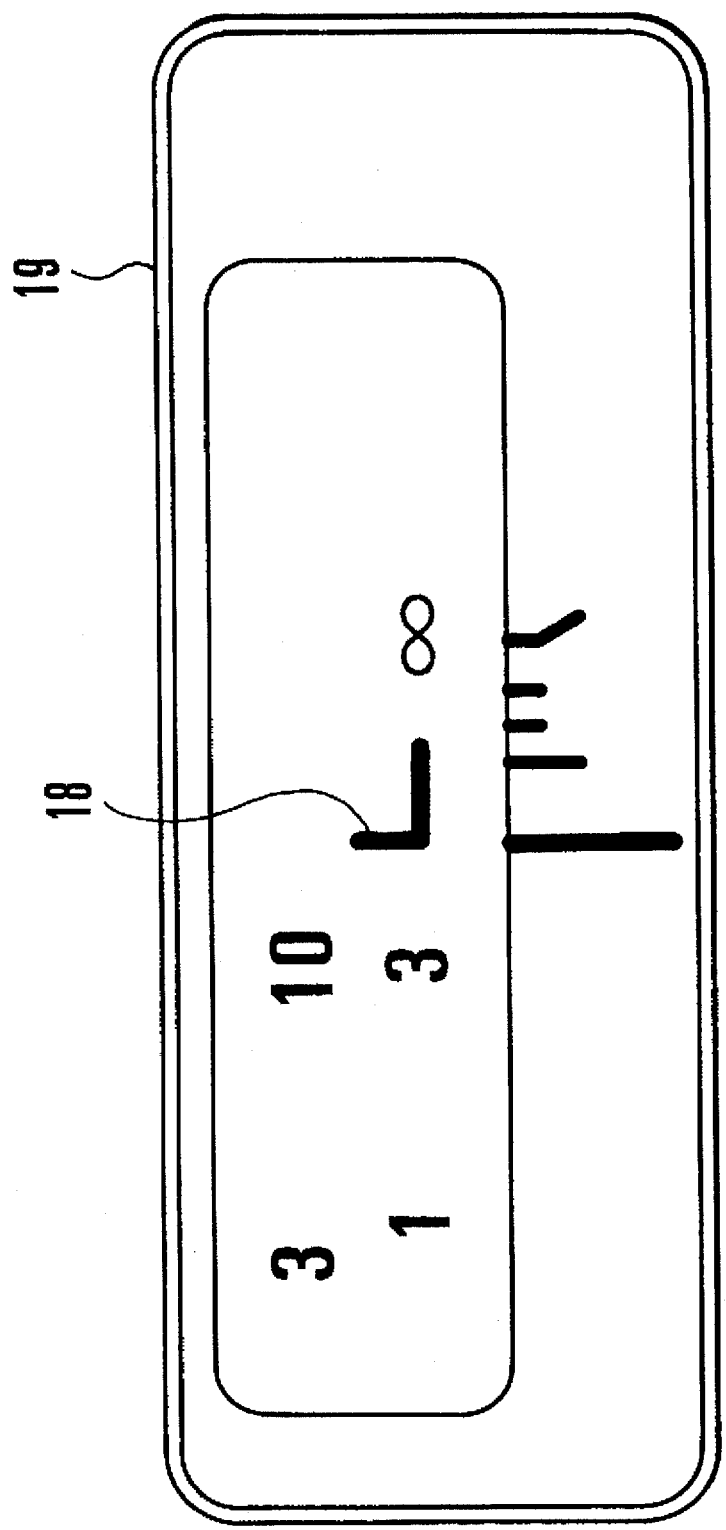
FIG. 3 is a front view showing a relation between a graduation window and distance graduations.

Next, focus error adjusting actions to be made at a telephoto end position and a wide-angle end position of the zoom lens are described as follows. FIG. 2 is a front view showing a relation obtained among the second holding frame 5, the focus adjustment key 9 and the focus key 8 as viewed from the fore end of the zoom lens. The focus error adjustment is made at the telephoto end and wide-angle end positions with the focus key 8 fitted in a recessed part 9d of the focus adjustment key 9 at the phase of an infinity distance position (a mark L) of the distance graduation part 18 as shown in FIG. 3, that is, with the focus key 8 and the distance graduation part 18 respectively in their infinity distance positions.

Figure 4:
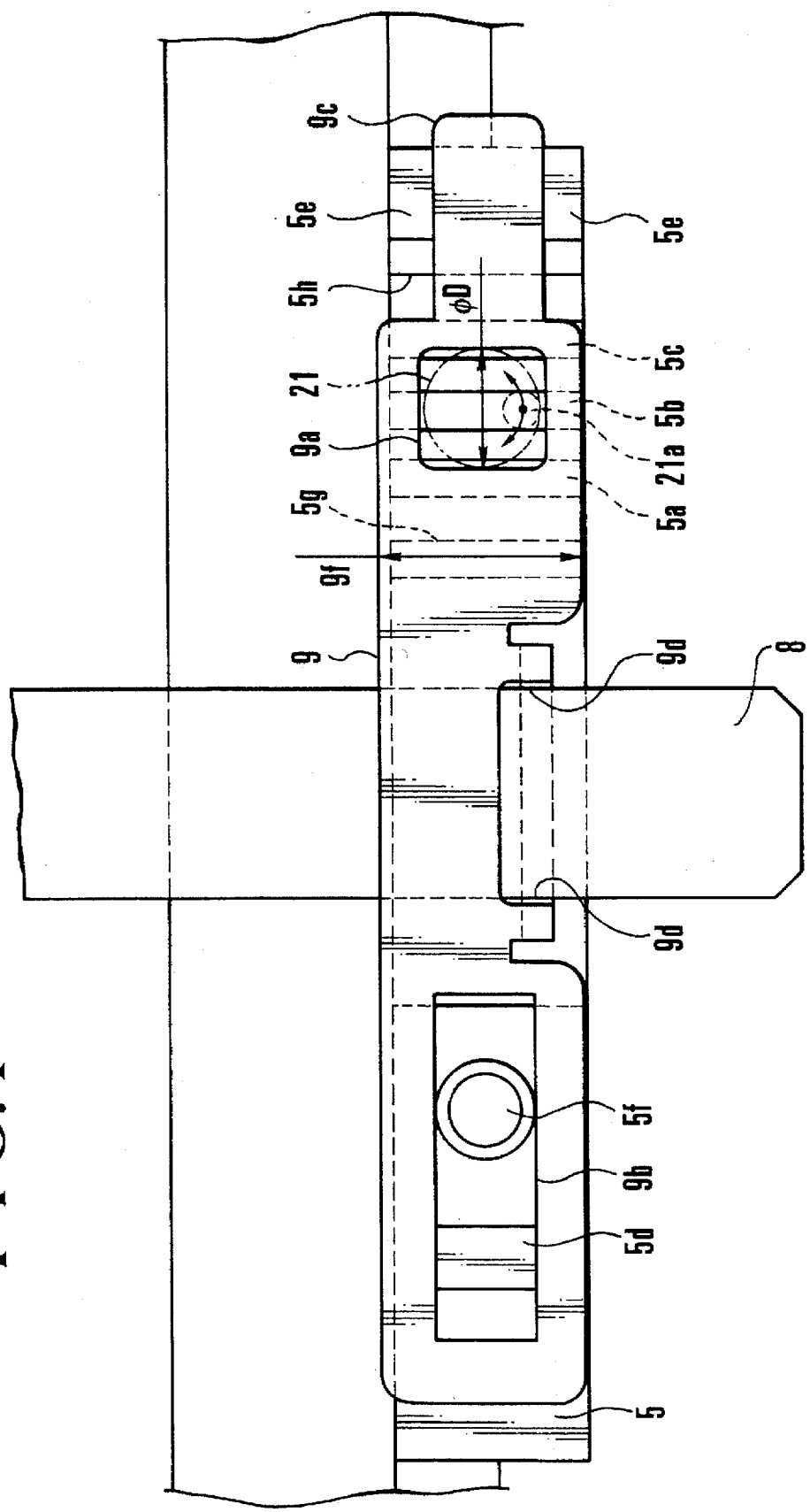
FIG. 4 is a plan view showing the zoom lens as viewed in the direction of arrow A indicated in FIG. 2.

The second holding frame 5 is provided, as shown in FIG. 2, with three vertical grooves 5a, 5b and 5c, projections 5d and 5e for positioning the focus adjustment key 9 and a tapping hole 5f for a mounting screw 20 having a washer. FIG. 4 is a development view showing the focus adjustment key 9, the focus key 8 and the second holding frame 5 as viewed from the direction of arrow A of FIG. 2 with the mounting screw 20 which has a washer omitted. The projection 5d of the second holding frame 5 is fitted into a slot 9b formed in the focus adjustment key 9. An end part of the focus adjustment key 9 is fitted in between the projections 5e of the second holding frame 5. The focus key 8 is perpendicularly fitted into a part 9d of the focus adjustment key 9.

An eccentric rod 21 which has an arbitrary amount of eccentricity relative to its center of rotation is used to be inserted in a hole part 9a of the focus adjustment key 9. A projection 21a which is formed at the fore end of the eccentric rod 21 is used to be inserted in one of the vertical grooves 5a, 5b and 5c of the second holding frame 5.

With the mounting screw 20 which has a washer loosened for deflecting the second holding frame 5, when the eccentric rod 21 which is inserted as shown in FIG. 4 is turned to the right or left from outside of the zoom lens (lens barrel), the engagement of the projection 21a with one of the vertical grooves 5a, 5b and 5c causes the second holding frame 5 to deflect to the right or left in an angular direction. The second holding frame 5 is then caused by this to move forward or backward according to the lead of the helicoid 3b. A focus error is adjusted at the telephoto end position and the wide-angle end position by thus adjusting distances between the first and second lens groups L1 and L2 and between the second and third lens groups L2 and L3.

Figure 5:
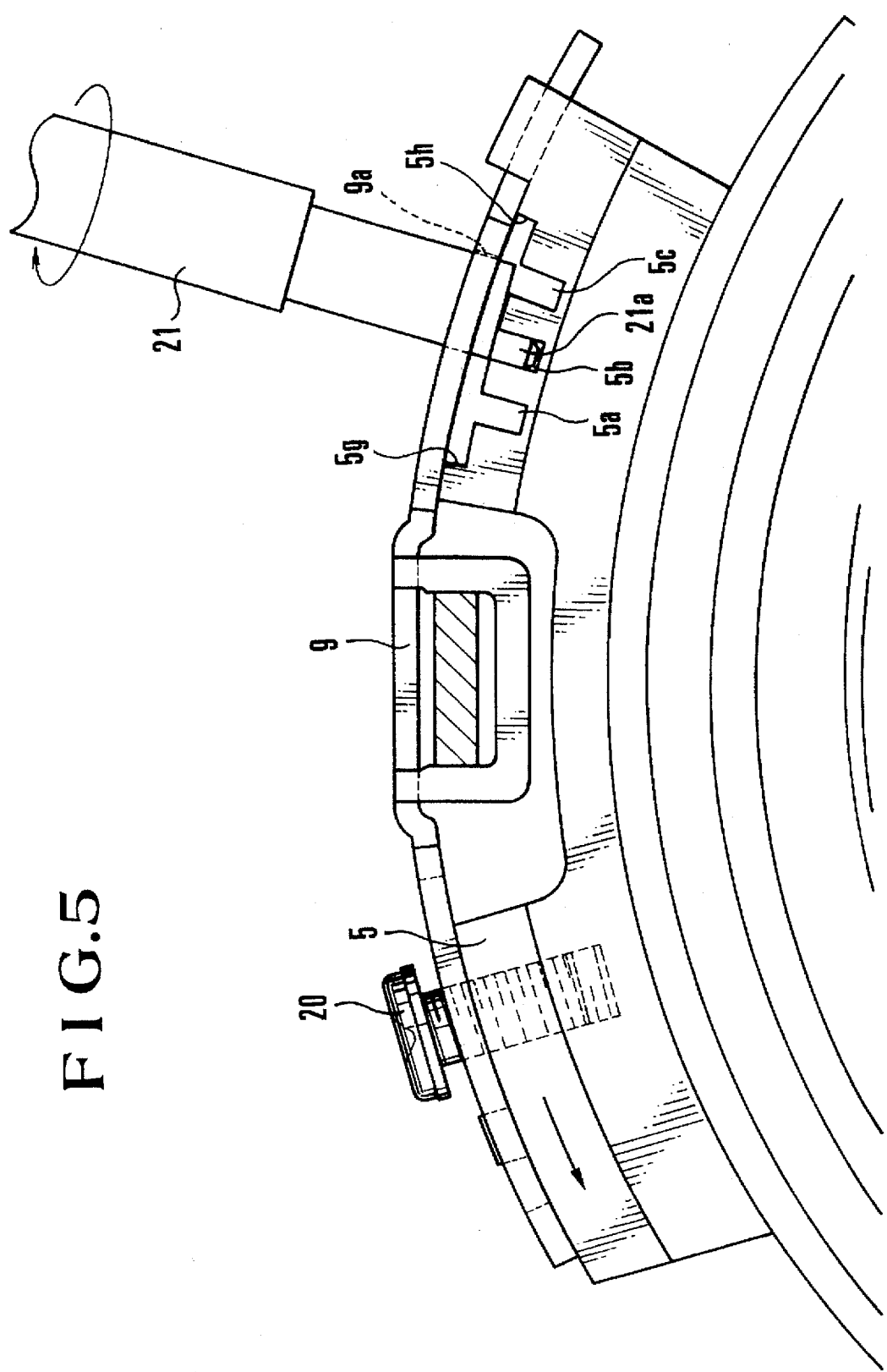
FIG. 5 is a front view showing adjustment work being performed on the relation shown in FIG. 2 by using an eccentric rod tool.

FIG. 5 shows a state obtained by turning the eccentric rod 21 to a maximum eccentric deflecting amount. In this instance, the maximum deflection amount of the second holding frame 5 represents a manufacturing error resulting from optical and mechanical factors of the whole lens. If the amount of eccentricity is insufficient for the current state, the eccentricity amount of the eccentric rod must be increased.

However, as shown in FIG. 4, the width 9f of the focus adjustment key 9 in the direction of thrust cannot be much increased. The diameter øD of the eccentric rod 21 is, therefore, determined by the limited width 9f, and the amount of eccentricity is also determined accordingly.

If the width 9f in the direction of thrust of the focus adjustment key 9 is increased to such a width that satisfies a desired amount of eccentricity, the movable ranges W1 and W2 of the second holding frame 5 and the focus adjustment key 9 for zooming or focusing would be restricted as apparent from FIG. 1. As a result, there arises a problem in that an extent to which the zoom lens can be drawn out becomes smaller to make the nearest shootable distance of the zoom lens longer.

To solve this problem, with the width 9f of the focus adjustment key 9 set at a minimum necessary length as shown in FIG. 4, the eccentric rod 21 is pulled out from the vertical groove 5b after deflecting it to its maximum amount of eccentricity, and then the eccentric rod 21 is inserted again by using the vertical groove 5c as shown in FIG. 5. By this, the second holding frame 5 can be moved in the same direction as shown in FIG. 6.

As described above, the eccentric rod 21 is moved to a point of the maximum eccentricity by using the vertical groove 5b of the second holding frame 5. With the eccentric rod 21 thus moved, when the next vertical groove 5c comes within the range of the slot part 9a of the focus adjustment key 9, the eccentric rod 21 is temporarily pulled out from the vertical groove 5b and, after that, the projection 21a of the eccentric rod 21 is inserted into the vertical groove 5c to move the eccentric rod 21 again, so that the second holding frame 5 can be deflected to a desired extent.

Figure 6:
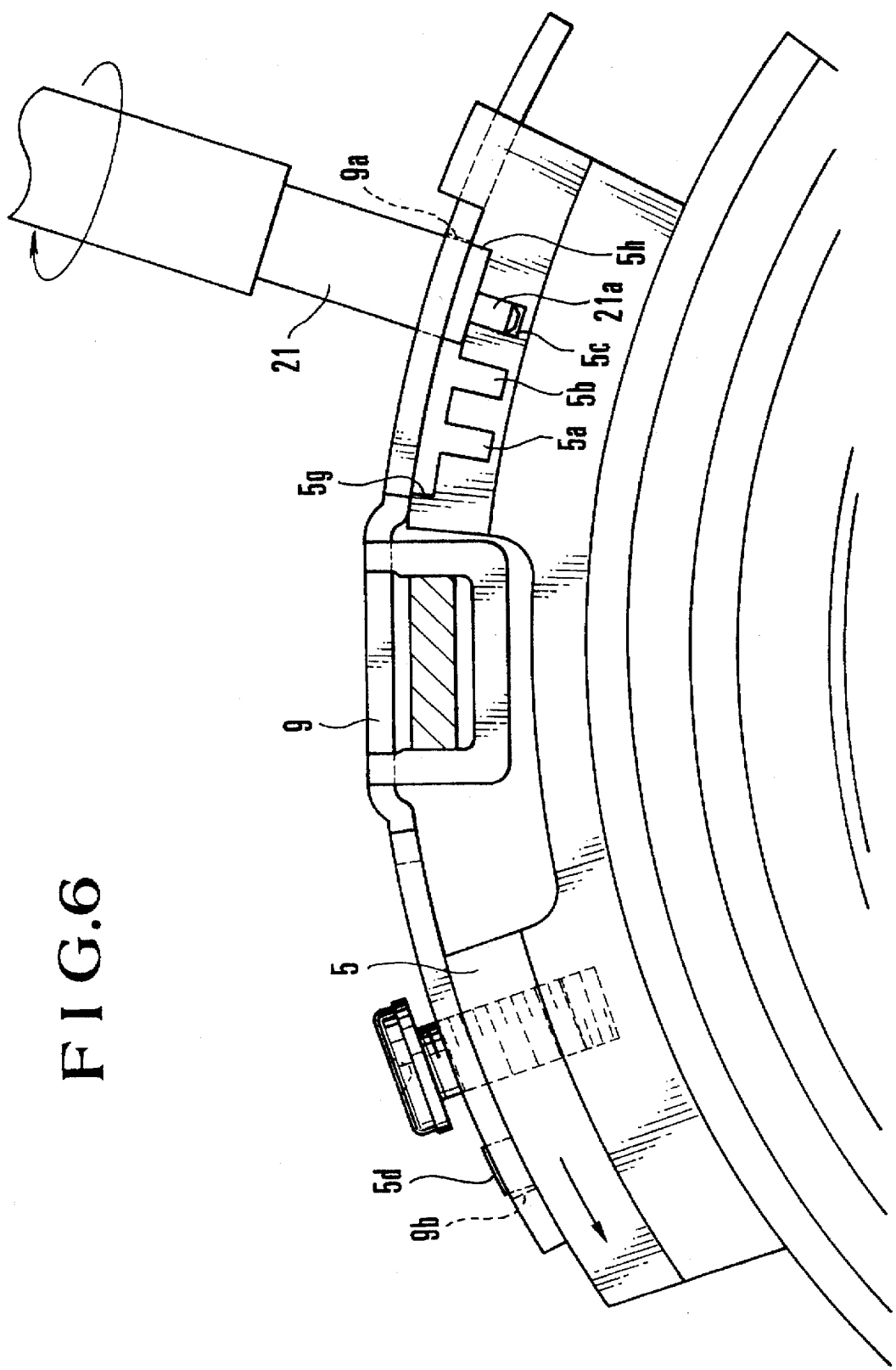
FIG. 6 is a front view showing adjustment work being performed on the relation shown in FIG. 2 also by using the eccentric rod tool.

Referring to FIG. 6, the stopping point of the second holding frame 5 may be determined by the projection 5d and the slot part 9b of the focus adjustment key 9. However, to avoid the possibility of damaging the projection 21a by excessively turning the eccentric rod 21, the second holding frame 5 is provided with walls 5h and 5g which are arranged to prevent the eccentric rod 21 from being turned in excess of a necessary range.

Figure 7:
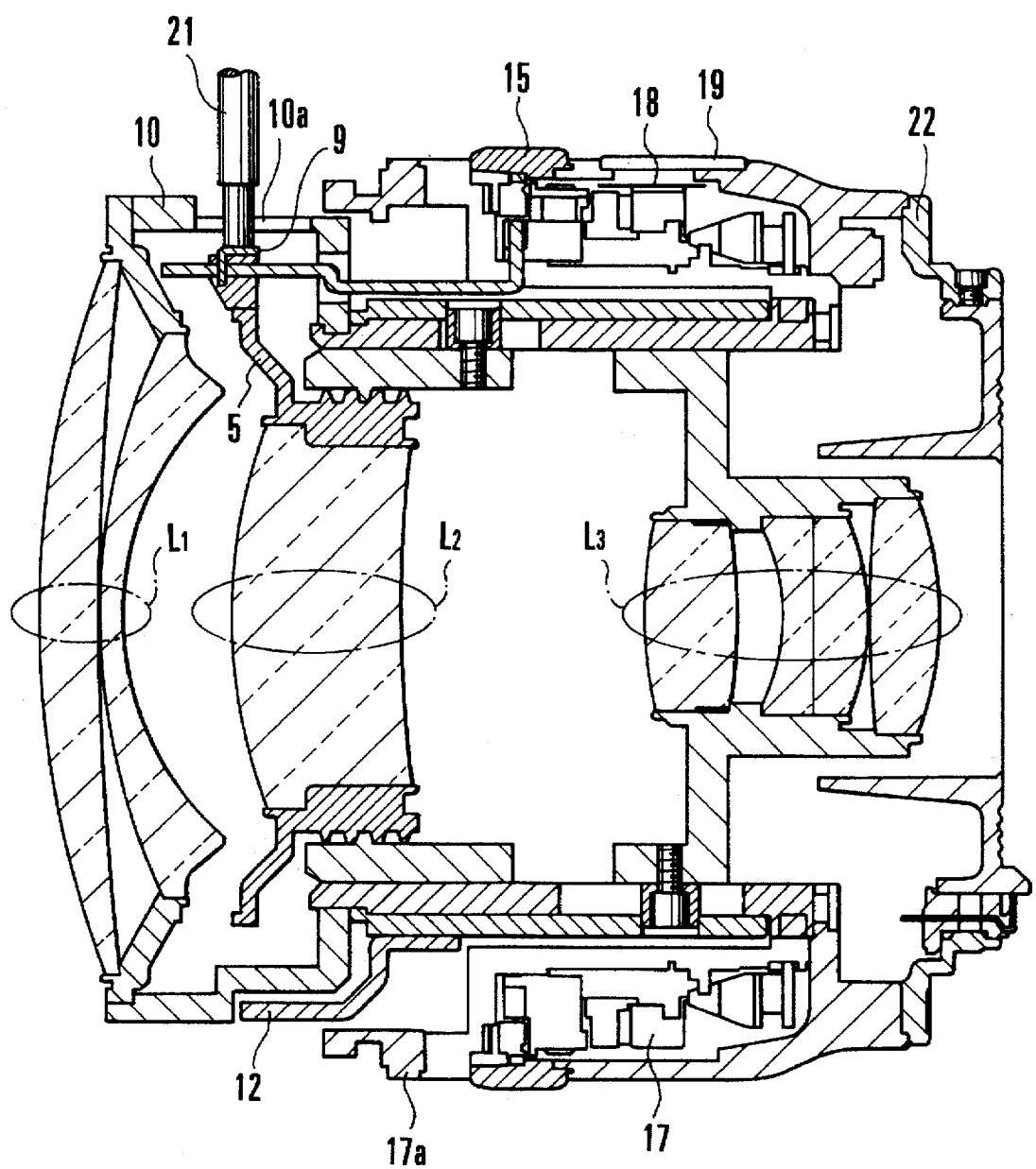
FIG. 7 is a vertical sectional view showing the whole zoom lens in a state of having the relation being adjusted by using the eccentric rod tool.

FIG. 7 is a sectional view showing the whole zoom lens in a state obtained when the work of focus error adjustment at the telephoto end and wide-angle end positions is in process. A cutout part 10a is provided in the fixed frame 10. The work can be carried out by inserting, through the cutout part 10a, the eccentric rod 21 and a driver (not shown) which is used for tightening the mounting screw 20 having a washer after completion of the adjustment.

In carrying out the work, the infinity distance mark L of the distance graduation part 18 is first adjusted to an index line provided on the graduation window 19 by rotating the manual ring 15, as shown in FIG. 3. The zoom key 12 is moved by hand to set it in its telephoto end position. The focus is then adjusted with an optical equipment such as a collimater or the like by turning the eccentric rod 21. Next, the zoom key 12 is moved by hand to set it in its wide-angle end position and the focus is adjusted to correct any deviation from an accurate focus by deflecting the back of the collimater or the like. This process of work is repeated several times until the deviation from an accurate focus is corrected both at the telephoto end and the wide-angle end positions. The amount of deviation of the back of the collimater or the like indicates the amount of correction of the mount 22.

Upon completion of the work, the mounting screw 20 having a washer is tightened by screwing it with the driver to fix the focus adjustment key 9 and the second holding frame 5 in their positions as shown in FIG. 2. The mounting screw 20 is provided with the washer for the purpose of not moving the focus adjustment key 9 in tightening the mounting screw 20.

In bringing the zoom lens into a finished state as shown in FIG. 1, the caulked part of the first lens group L1 and screws (not shown) used for mounting the first holding frame 4 on the fixed frame 10 are hidden by bayonet-coupling the hood mounting ring 16 which has a face ring part 16b in one body therewith with a bayonet claw 11a which is provided at the inner diameter part of the zoom ring 11. Then, by using a bayonet claw 11b which is located in rear of the inner diameter part of the zoom ring 11, the zoom ring 11 is moved from an ultra wide-angle end (or an ultra telephoto end) position to bayonet-couple it with the connection ring 17a. The projection 16a of the hood mounting ring 16 is then inserted with pressure into the connection ring 17a.

The zoom ring 11 is rotated to the normal wide-angle end position and the zoom key 12 is tightly screwed by the zoom ring mounting screw 13. In this state, the hood mounting ring 16 never comes off its position as it is restricted by the bayonet claw 11a of the zoom ring 11. After tightening, the rubber piece 14 is wound around the outer circumference of the zoom ring 11 to hide the zoom ring mounting screw 13 for the sake of appearance.

Figure 8:
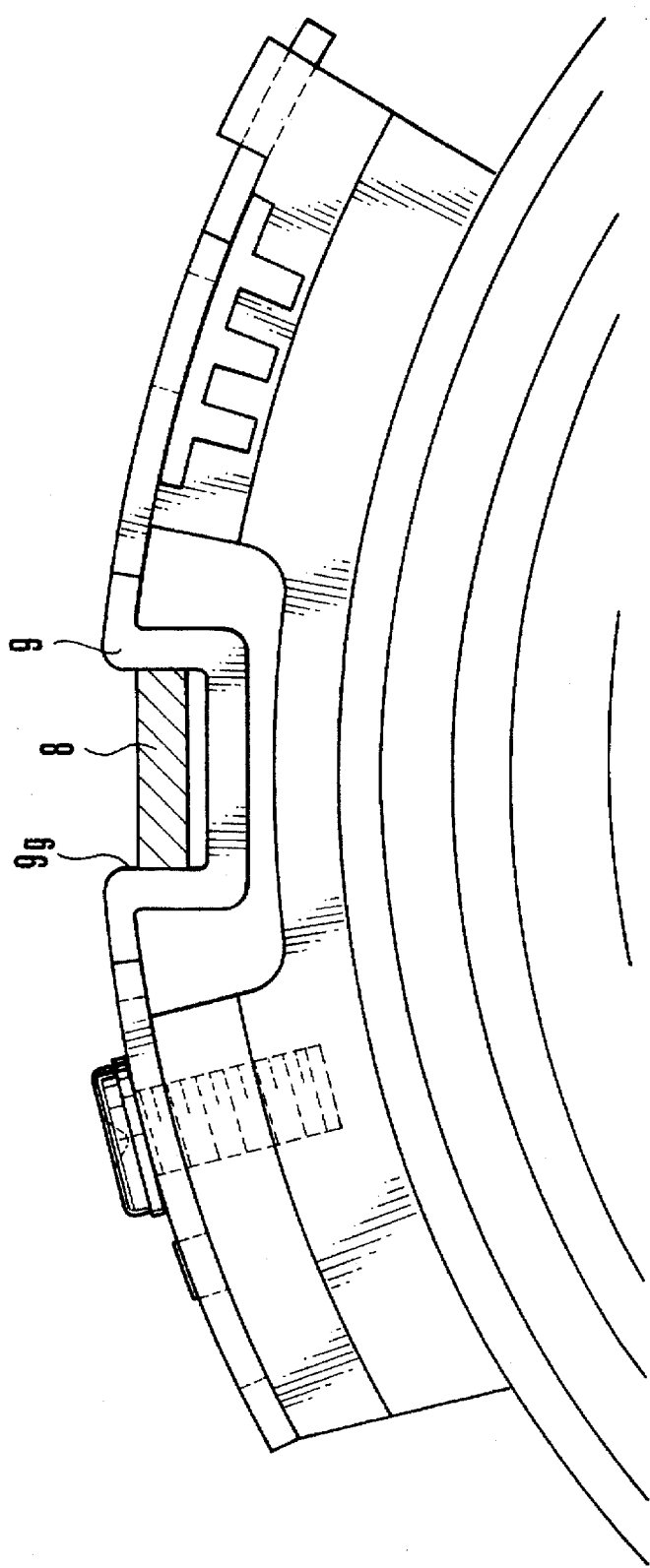
FIG. 8 is a front view showing a zoom lens arranged as a second embodiment of this invention in which a focus adjustment key is arranged differently from the focus adjustment key of the first embodiment.

FIG. 8 is a front view of a second embodiment of this invention showing a relation obtained among the second holding frame 5, the focus adjustment key 9 and the focus key 8 as viewed from the fore end of the lens. In the case of the second embodiment, the first embodiment is modified by bending a middle part of the focus adjustment key 9 into a U shape bent part 9g. The focus key 8 is fitted into the bent part 9g of the focus adjustment key 9.

As described above, each of the first and second embodiments is arranged to have focus error corrected by using the second lens group or the focus lens group which is arranged subsequent to the second lens group. Therefore, even in the case of a zoom lens having a first lens group which has a low sensitivity, the focus error can be adjusted at the telephoto end position and the wide-angle end position with the nearest shootable distance set at a short distance value. Further, the use of the focus adjustment key permits fine adjustment from outside of the lens barrel by means of the eccentric rod tool.

Figure 9:
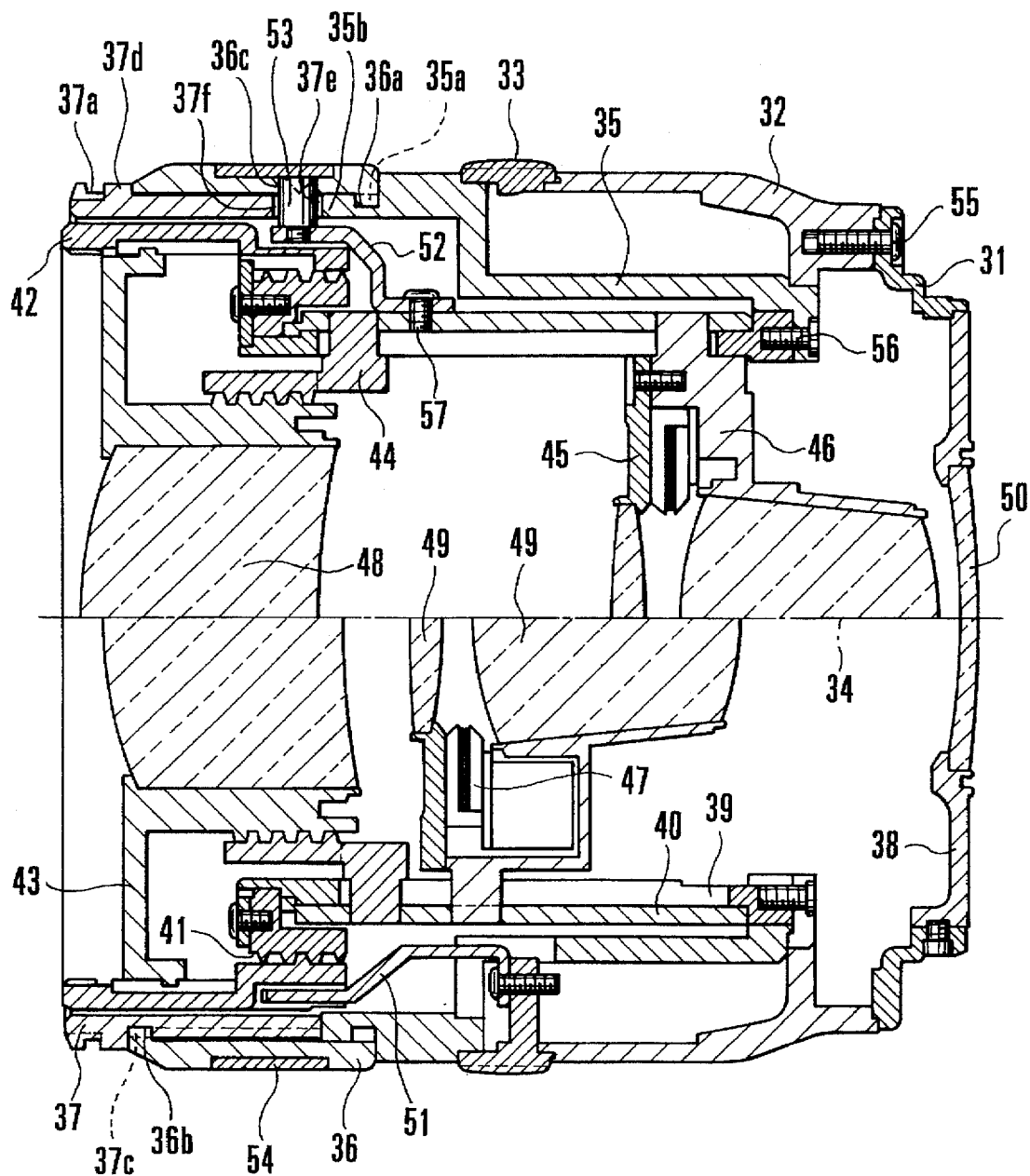
FIG. 9 is a sectional view showing an interchangeable zoom lens arranged according to this invention as a third embodiment thereof.

FIG. 9 is a sectional view showing an interchangeable zoom lens barrel which is arranged as a third embodiment of this invention. The illustration includes a mount 31, an external ring 32, a distance adjusting operation ring 33, an optical axis 34, a holding ring 35, a zooming operation ring 36, a hood frame 37, a back lid 38, a guide tube 39, a cam tube 40, a male helicoid 41, a filter frame 42, a first lens group tube 43, a first lens group moving ring 44, a second lens group tube A 45, a second lens group tube B 46, a diaphragm 47, a first lens group 48, a second lens group 49, a third lens group 50, a focus key 51, a zoom connection plate 52, a connection screw 53, and a rubber ring 54 mounted on the zooming operation ring 36.

In the case of the third embodiment, this invention is applied to a zoom lens barrel of the so-called 3-group short zoom type. The zoom lens barrel is arranged to move an optical system for zooming in the known manner. Therefore, the following description is limited to parts related to this invention.

In the arrangement described above, the distance adjusting operation ring 33 is sandwiched in between the holding ring 35 and the external ring 32 which is screwed to the mount 31 by screws 55.

The holding ring 35 is screwed to guide tube 39 by screws 56 in the direction of thrust and is carried by the mount 31 through the external tube 32 as a fixed part in one unified body with the mount 31. A bayonet part 35a is provided on the outer diameter side of the holding ring 35 for the purpose of allowing the zooming operation ring 36 to rotate at a set position. The bayonet part 35a is bayonet-coupled with a bayonet part (claw part) 36a which is provided at one end of the inner diameter part of the zooming operation ring 36 on the side of the mount 31.

A second bayonet part 36b is provided on the inner diameter side of the zooming operation ring 36 and is bayonet-coupled with a bayonet part 37c which is provided on the outer diameter side of the hood frame 37.

A plurality of engaging projections 37e are provided at one end of the hood frame 37 on the side of the mount 31 and are fitted into engaging cutout parts 35b formed in the front end side of the holding ring 35. A bayonet part 37a is provided at the front end part of the hood frame 37 for mounting an accessory (not shown) such as a petal type hood or the like. The zoom connection plate 52 is screwed to the cam tube 40 by a screw 57 and arranged to rotate at a set position together with the cam tube 40. The zoom connection plate 52 extends from its part fixed by the screw 57 beneath the inner diameter side of the zooming operation ring 36 to be in screwed connection with a connection screw 53 which pierces through a hole part 36c extending in a slot shape in the direction of the optical axis and a cutout part 37f of the hood frame 37. The hole part 36c is covered with the rubber ring 54 when the zoom lens barrel is in a finished state.

FIGS. 10 to 13 are development views showing assembly work on the third embodiment and the operation of it. In these drawings, thick FIGS. 1 to 4 indicate in a developed shape, points separated 90 degrees from each other, altogether covering a whole circumference of 360 degrees in the order of "1", "2", "3" and "4" clockwise as viewed from the rear of the lens with the point "1" located right above the optical axis. Further, in these drawings, the same component parts as these shown in FIG. 9 are indicated by the same reference numerals.

Figure 10:
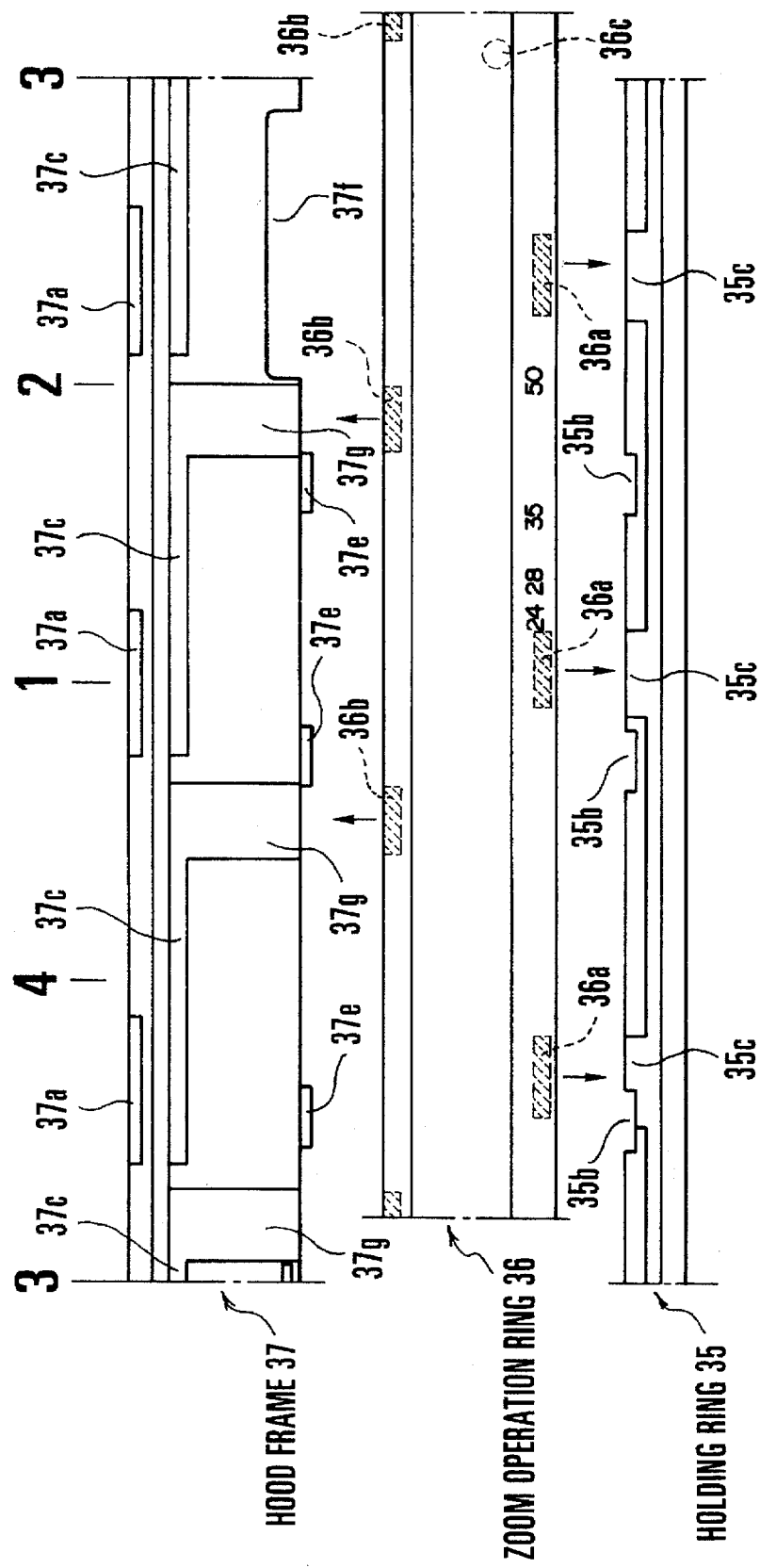
FIG. 10 is a plan view showing a holding ring, a zooming operating ring and a hood frame shown in FIG. 9 in a state of being arranged in their assembly phases.

FIG. 10 is a plan view showing the arrangement of the holding ring 35, the zooming operation ring 36 and the hood frame 37 at their assembly phases. These parts are assembled by moving them relative to each other in the directions of arrows indicated in FIG. 10. Incidentally, the bayonet parts 36a and 36b which are provided in front and in rear of the inner circumferential side of the zooming operation ring 36 are illustrated by broken-line hatching for easy reference. The bayonet part 36b is squarely opposed to a bayonet entrance 37g of the hood frame 37, and the bayonet part 36a to a non-bayonet part 35c of the holding ring 35 in the direction of an optical axis. The hood frame 37 and the holding ring 35 thus can be mounted on the zooming operation ring 36 in any order of sequence.

Figure 11:
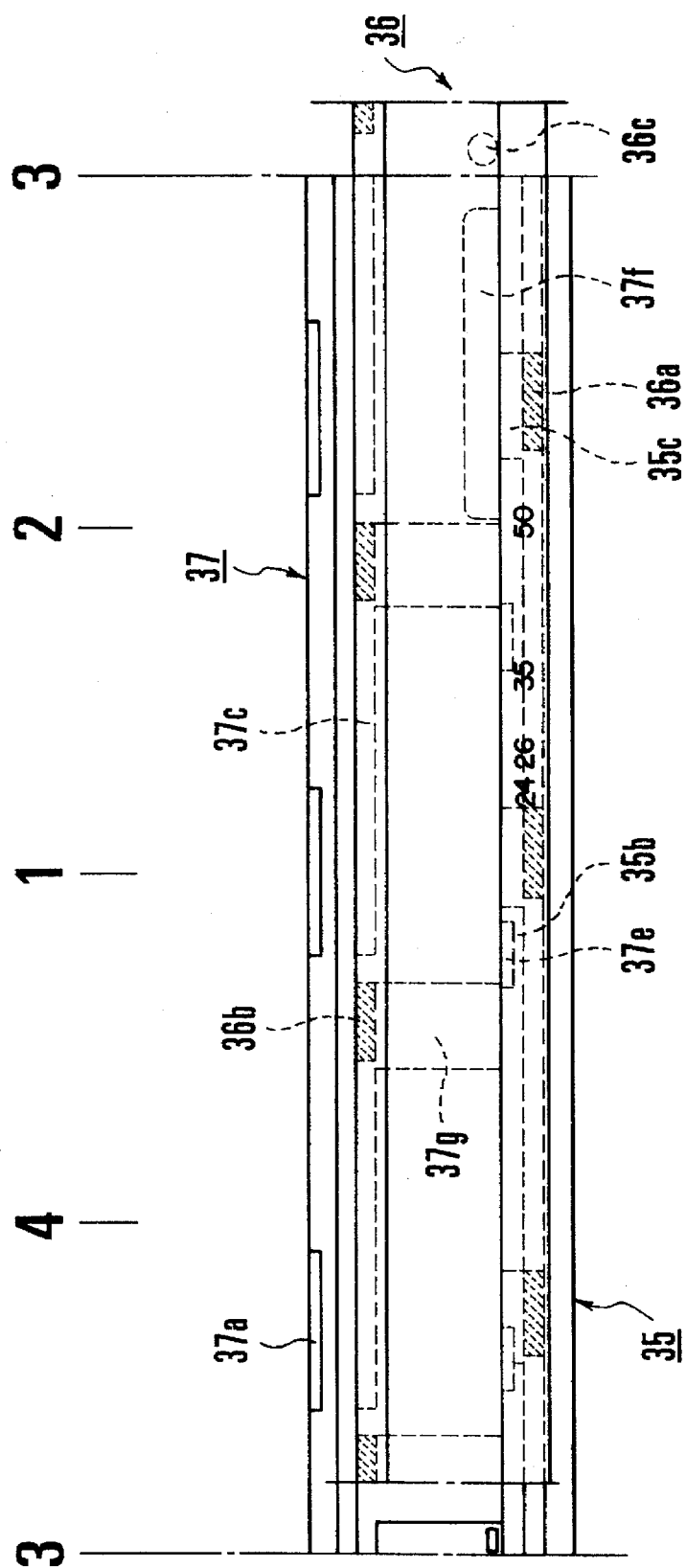
FIG. 11 is a plan view showing these parts in a state of having been axially moved to engage each other from the state shown in FIG. 10.

FIG. 11 shows in a plan view a state obtained after completion of engagement in the axial direction. In this state, the engaging projections 37e of the hood frame 37 are fitted in the engaging cutout parts 35b of the holding ring 35 to restrict the rotation of the hood frame 37.

Figure 12:
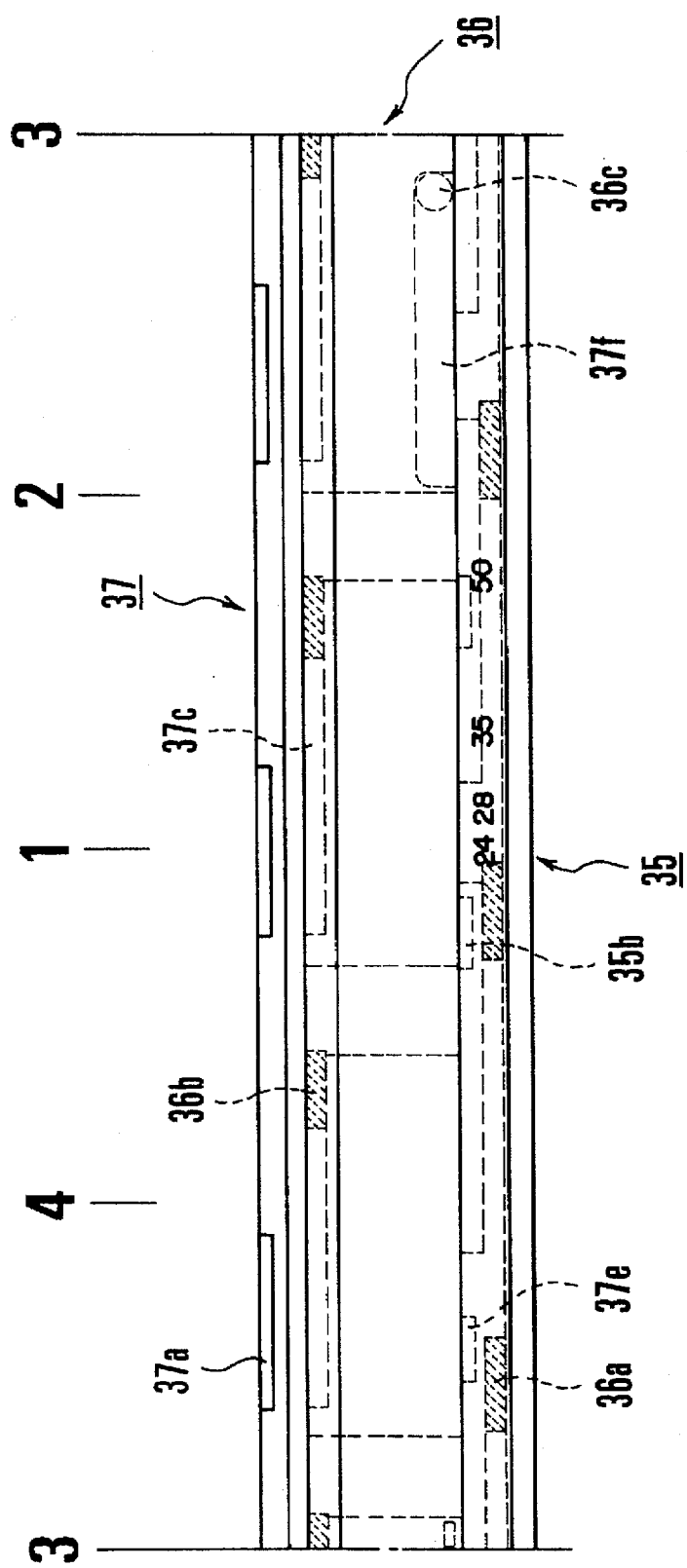
FIG. 12 is a plan view showing these parts in a state obtained by rotating the zooming operation ring from the state shown in FIG. 11.

FIG. 12 shows in a plan view a state obtained with the zooming operation ring 36 rotated from the state of FIG. 11. In the state of FIG. 12, each pair of the bayonet parts are axially engaged into one body with each other. The cutout part 37f of the hood frame 37 begins to coincide with the slot 36c of the zooming operation ring 36, and the zoom connection plate 52 comes to be exposed to the outside in this state. The connection screw 53 is mounted in this stage to complete assembly work on the three ring-shaped parts 35, 36 and 37.

Figure 13:
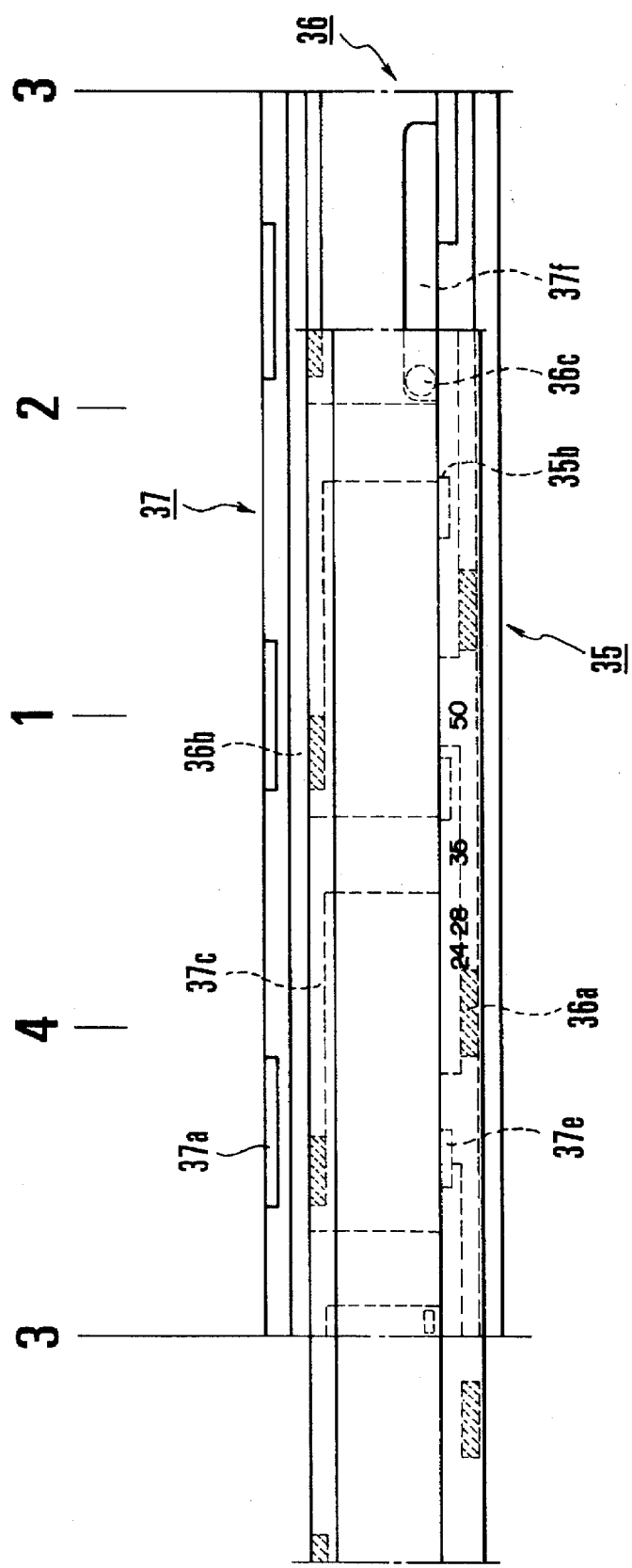
FIG. 13 is a plan view showing these parts in a state obtained by rotating counterclockwise the zooming operation ring to the end of its operating angle from the state shown in FIG. 12.

FIG. 13 shows in a plan view a state obtained by rotating the zooming operation ring 36 counterclockwise from the state of FIG. 12 to the end of its operating angle after completion of the assembly work.

As shown in FIGS. 12 and 13, each cutout end of the cutout part 37f of the hood frame 37 serves as a stopper against the connection screw 53, so that the range of rotation of the zooming operation ring 36 relative to the hood frame 37 and the holding frame 35 is restricted by the cutout part 37f.

Figure 14:
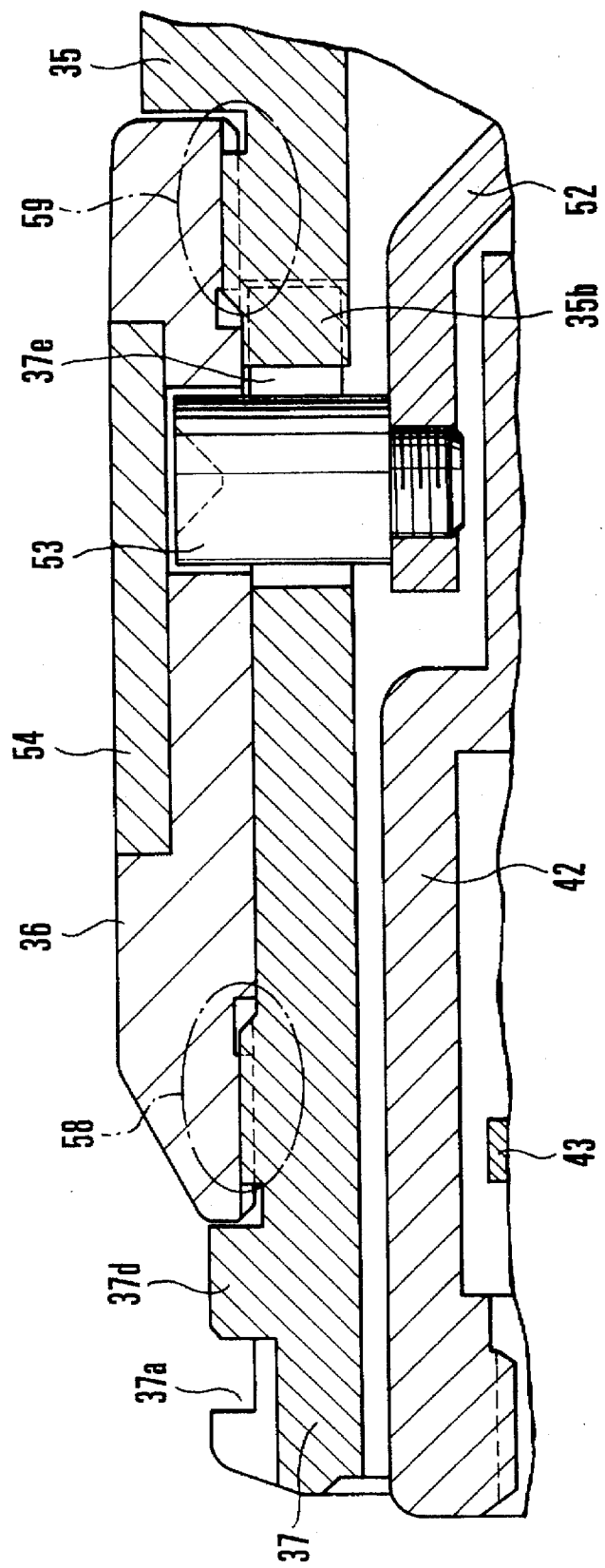
FIG. 14 is an enlarged sectional view showing essential parts of a fourth embodiment of this invention.

FIG. 14 is a sectional view showing in an enlarged state the arrangement of essential parts of a fourth embodiment of this invention. In FIG. 14, all parts performing the same functions as those of the third embodiment shown in FIG. 9 are indicated by the same reference numerals. The fourth embodiment differs from the third embodiment in that the zooming operation ring 36 is coupled to the holding ring 35 and to the hood frame 37 by screw parts 59 and 58 which are threaded reversely to each other at fine pitches arranged in such a pitch number as to engage in the same manner.

The engaging cutout parts 35b which serve as a rotation stopper and the engaging projections 37e are coupled with each other while simultaneously screwing the two reverse screw parts 58 and 59 to bring them into an assembled state as shown in FIG. 14. After that, the connection screw 53 is mounted and the zooming operation ring 36 is covered with the rubber ring 54 to bring the lens barrel into a finished state.

In the case of this embodiment, the hood frame 37 is drawn out as much as the sum of the leads of the two screw parts 58 and 59 to the amount of one lead within the operating rotation angle of the zooming operation ring 36. However, with the screw parts 58 and 59 arranged to have the fine pitches and to be used to an amount of rotation less than 360 degrees, the embodiment gives the same advantageous effect as that of the third embodiment.

Figure 15:
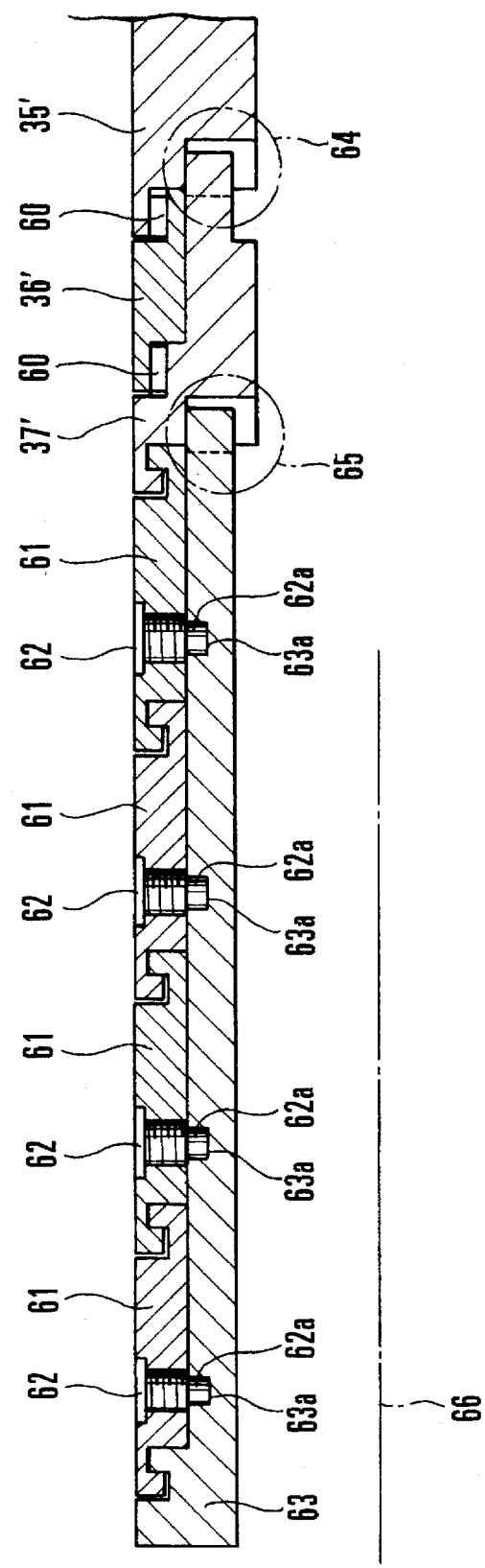
FIG. 15 is an enlarged sectional view showing essential parts of a fifth embodiment of this invention.
Figure 16:
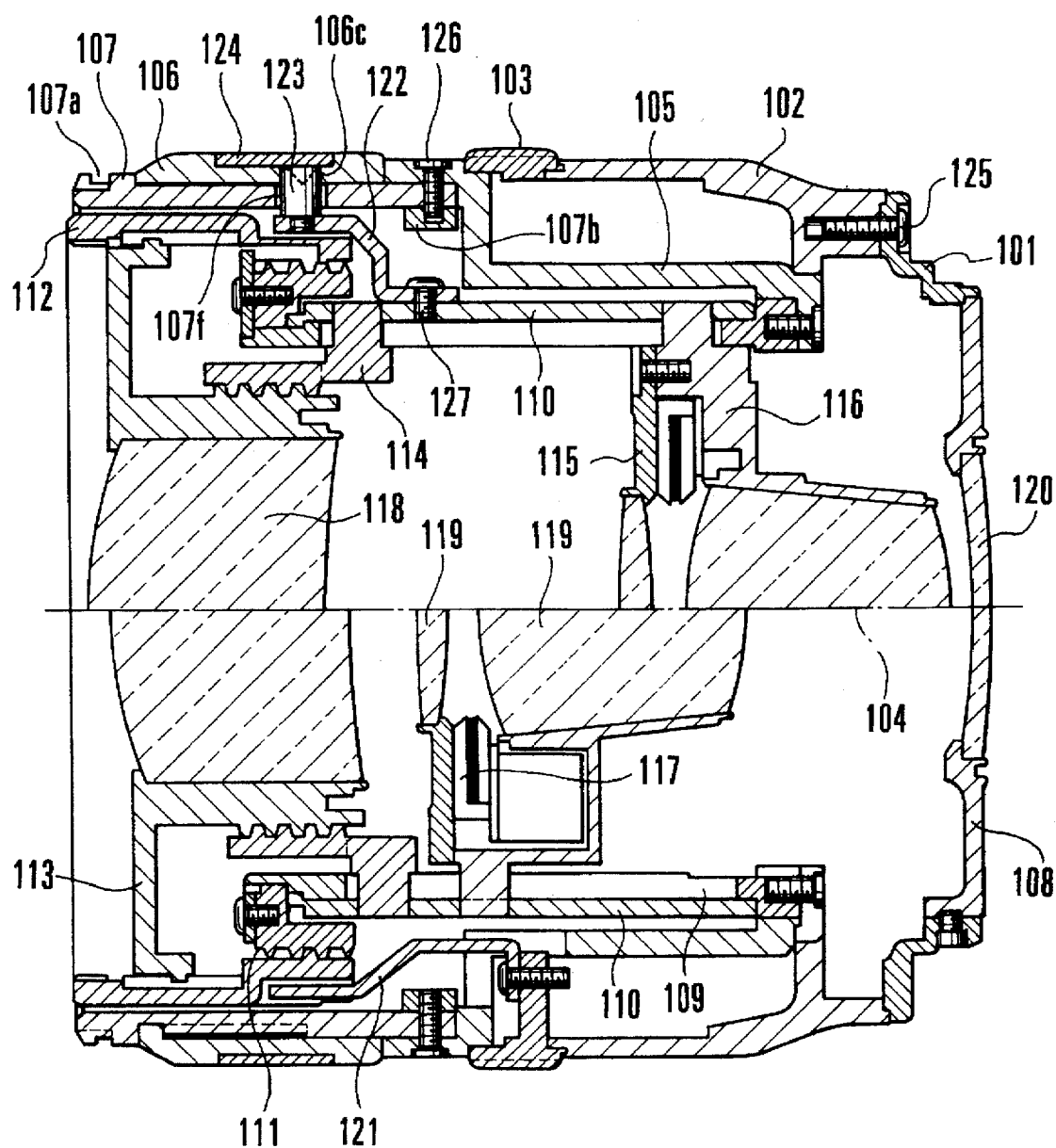
FIG. 16 is a sectional view showing the conventional interchangeable zoom lens.

FIG. 15 is a sectional view showing in an enlarged state the arrangement of essential parts of a fifth embodiment of this invention. The illustration includes a fixed part 35', an operation ring 36' and a first semi-fixed part (member) 37'. These parts are obtained by simplifying the members 35, 36 and 37 shown in FIG. 14 to such an extent as to meet fundamental requirements only.

Referring to FIG. 15, in the fifth embodiment, screw parts 60 are arranged to connect the operation ring 36' to the fixed part 35' and to the first semi-fixed part 37'. Second, third, fourth and fifth operation rings 61 have rotation stoppers 62 screwed thereto in the radial direction. The rotation stoppers 62 are provided respectively with stopper pins (projections) 62a which are of a smaller diameter than the screw diameter of the rotation stoppers 62 and are disposed on the side of a second semi-fixed part 63. The stopper pins 62a are loosely fitted into circumferential grooves 63a formed in the second semi-fixed part 63 on the side of the operation ring 61. A rotation angle is thus limited by this arrangement.

Each of the operation rings 61 is thus kept in a set position in the direction of an axis of rotation by bayonet coupling with the first semi-fixed part (member) 37', bayonet coupling with an adjacent operation ring and bayonet coupling with the second semi-fixed part 63. The second semi-fixed part 63 is locked by an engaging part 65 to be not rotatable relative to the first semi-fixed part (member) 37'. Reference numeral 64 denotes a rotational engagement part, and reference numeral 66 denotes the axis of rotation.

The second to fifth operation rings 61 can be individually operated to rotate it to a predetermined angle. With the number of the bayonet claws assumed to be expressed as "n", the range of operation angle of the operation rings 61 is less than 360°/ n.

The number of stages of the operation rings shown in FIG. 15 as the second to fifth operation rings 61 may be increased to a greater number of stages as long as the engaging precision at each stage permits the increase. Further, in view of similarity to a relation obtained among the fixed part 35', the operation ring 36' and the first semi-fixed part 37' as shown in FIG. 15, the bayonet coupling between the second distance ring 61 and the first semi-fixed part 37' and/or between the fifth operation ring 61 and the second semi-fixed part 63 may be changed to screw coupling or to some other known rotational, set position coupling arrangement.

According to the arrangement of the third to fifth embodiments of this invention, each of the apparatuses having operation rings such as the zooming operation ring 36 which are kept rotatable approximately in set positions relative to fixed parts such as the holding ring 35 and semi-fixed parts such as the hood frame 37 which are disposed adjacent to the operation rings is arranged as follows. The semi-fixed part such as the hood frame 37 is coaxially carried by the operation ring in such a way as to be rotatable relative to the latter approximately in a set position. The semi-fixed part is provided with an engaging part for engaging an engaging means provided on the fixed part such as the holding ring 35. The semi-fixed part is arranged to be not rotatable relative to the fixed part approximately in a set position by engaging the fixed part through its engaging part and the engaging means provided on the fixed part. The invented arrangement gives the following advantages.

1) Parts can be arranged to be carried by fixed parts such as the holding ring 35 without screwing.

2) Therefore, disassembling and assembling work can be facilitated to enhance serviceability.

3) Since tapping for screwing or a thickened (boss) part necessary for self-tapping in the event of molded material is not necessary, spatial limitation for arrangement of parts within the apparatus can be eased.

4) An external pressure axially applied to the fore end part of the apparatus is transmitted from a semi-fixed member such as the hood frame 37 through an adjoining operation ring to a fixed part. An external pressure applied in the direction of rotation is transmitted from the semi-fixed member directly to the fixed part. An external pressure thus can be dispersedly borne. Compared with the conventional arrangement of axially receiving an external pressure in its entirety before and after the inner diameter part of an operation ring, the semi-fixed part can be arranged to have a thinner thickness. In other words, while the thickness up to the engaging part of the operation ring of the semi-fixed part is the same as the conventional arrangement, the thickness for a part extending in the direction of axis from the engaging part to the fixed part can be determined by considering only a strength necessary for stopping rotation. The invented arrangement thus permits reduction in thickness.

As described above, in each of the third, fourth and fifth embodiments, a semi-fixed member is coaxially carried by an operation ring in such a way as to be rotatable approximately in a set position. The semi-fixed member is provided with an engaging part for engaging an engaging means provided on a fixed part which carries the operation ring. The semi-fixed member is thus arranged to become not rotatable when the engaging part engages the engaging means. By virtue of this arrangement, the semi-fixed member which is located at a fore end part of the apparatus can be mounted on the fixed part by an engaging means such as a bayonet coupling mechanism without recourse to screwing.

The invented arrangement not only facilitates assembling work but also effectively eases a spatial limitation imposed on arrangement of parts within the apparatus.

What is claimed is:

1. An optical apparatus, comprising:
   a holding member for holding an optical element;
   driving means;

a moving mechanism for moving said holding member by said driving means; and an adjusting mechanism for adjusting the position of said holding member by using said moving mechanism and not using said driving means, said adjusting by said adjusting mechanism being an adjustment during the assembling of said holding member.

2. An optical apparatus according to claim 1, wherein said moving mechanism includes helicoid structure.

3. An optical apparatus according to claim 2, wherein said optical element is a focusing lens arranged to perform a focusing action by moving.

4. An optical apparatus according to claim 3, wherein said optical apparatus has a forward end and wherein said focusing lens is located rearwardly of said forward end on an optical axis.

5. An optical apparatus according to claim 4, further comprising another lens arranged to perform a zooming action by moving.

6. An optical apparatus according to claim 5, wherein said focusing lens is arranged to be used for focus error adjustment by moving said focusing lens for fine adjustment and wherein said adjusting mechanism is arranged to cause said moving mechanism to move said focusing lens at a telephoto end position and a wide-angle end position of said optical apparatus.

7. An optical apparatus according to claim 6, wherein said adjusting mechanism includes an eccentric rotating member for applying rotational driving to said moving mechanism.

8. An optical apparatus according to claim 1, wherein said optical element is a focusing lens arranged to perform a focusing action by moving.

9. An optical apparatus according to claim 8, wherein said optical apparatus has a forward end and wherein said focusing lens is located rearwardly of said forward end on an optical axis.

10. An optical apparatus according to claim 9, further comprising another lens arranged to perform a zooming action by moving.

11. An optical apparatus according to claim 10, wherein said focusing lens is arranged to be used for focus error adjustment by moving said focusing lens for fine adjustment and wherein said adjusting mechanism is arranged to cause said moving mechanism to move said focusing lens at a telephoto end position and a wide-angle end position of said optical apparatus.

12. An optical apparatus according to claim 11, wherein said adjusting mechanism includes an eccentric rotating member for applying rotational driving to said moving mechanism.

13. An optical apparatus according to claim 1, wherein said adjusting mechanism includes an eccentric rotating member for applying rotational driving to said moving mechanism.

14. An optical apparatus according to claim 13, further including means provided on said adjusting mechanism for restricting movement of said adjusting mechanism relative to said holding member, thereby limiting an operation of said adjusting mechanism by which said adjusting mechanism causes said moving mechanism to move said holding member.

15. An optical apparatus according to claim 7, wherein a rotation axis of said eccentric rotating member is approximately perpendicular to an optical axis of said optical apparatus.

16. An optical apparatus, comprising:

a first fixing member;

a rotational operation member for moving an optical element, said operation member being connectable to said first fixing member by rotation; and a second fixing member connectable to said rotational operation member by rotation, wherein said first and second fixing members are mutually fixed relative to the rotation direction of the rotational operation member by inserting one of said first and second fixing members into the other member and said rotational operation member is rotatable in the rotation direction relative to said first and second fixing members.

17. An optical apparatus according to claim 16, wherein said rotational operation member is connectable to said first fixing member by a bayonet or a screw.

18. An optical apparatus according to claim 16, wherein said second fixing member has a part formed to restrict an angle of rotation of said rotational operation member.

19. An optical apparatus according to claim 16, wherein said rotational operation member is connectable to said second fixing member by a bayonet or a screw.

20. An optical apparatus, comprising:

a holding member for holding a lens;

driving means having an arm portion fixable to said holding member and rotatable so as to rotate said holding member;

means for converting the rotation of said holding member into the movement in the optical axis direction of said holding member; and an adjusting mechanism for rotating said holding member so to change the rotating position of said holding member relative to said arm portion.

21. An apparatus according to claim 20, wherein said adjusting mechanism rotates said holding member during the assembling working of said lens barrel.

* * * * *

UNITED STATES PATENT AND TRADEMARK OFFICE
CERTIFICATE OF CORRECTION

PATENT NO. : 5,689,375
DATED      : November 18, 1997
INVENTOR(S): Satoh et. al

It is certified that error appears in the above-identified patent and that said Letters Patent are hereby corrected as shown below:

Col. 5, line 22,   after "projections"   insert   -- 5d and --.

Col. 11, line 17,  delete "another lens"  and insert  -- a zooming lens. --.

Col. 11, line 17,  delete "arranged to perform a zooming action by moving."

Col. 11, line 36,  delete "another lens"  and insert  -- a zooming lens. --.

Col. 11, line 36,  delete "arranged to perform a zooming action by moving."

Col. 12, line 8,   delete "claim 7"   and insert   -- claim 13 --.

Signed and Sealed this

Nineteenth Day of May, 1998

Attest:

BRUCE LEHMAN

*Attesting Officer*      *Commissioner of Patents and Trademarks*